UNITED STATES PATENT OFFICE.

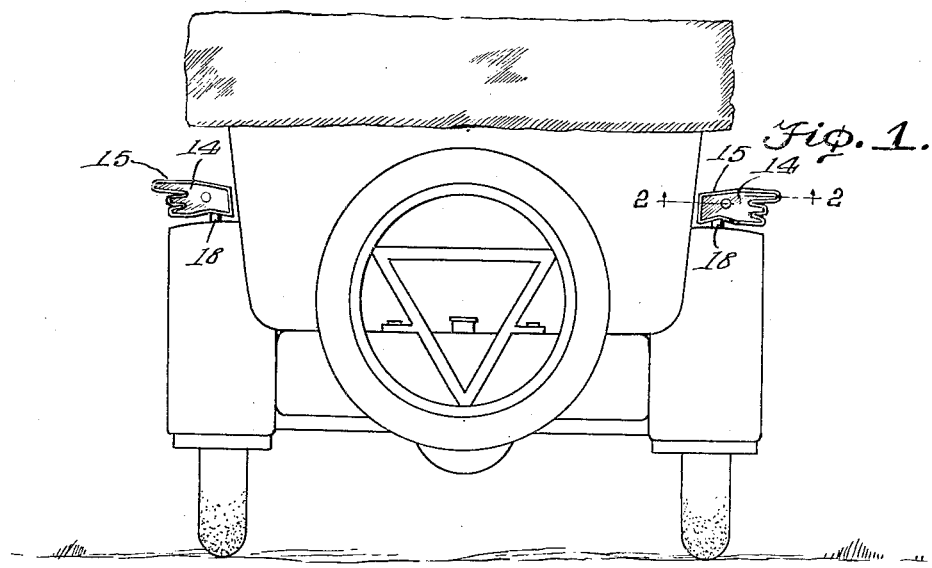
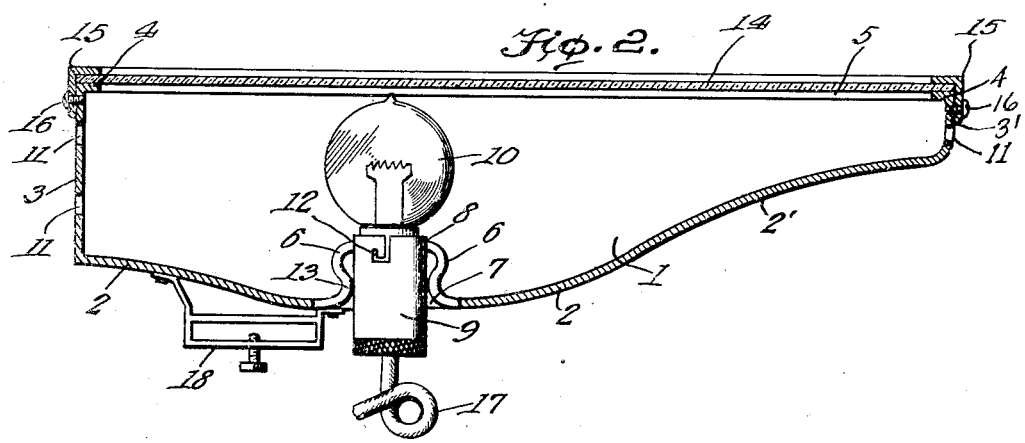
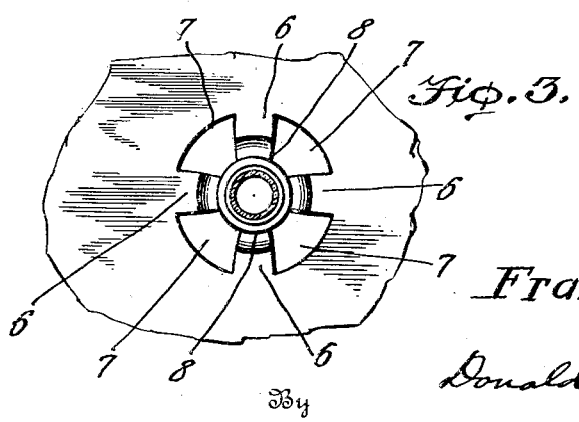

FRANK TOKANOS, OF LONG BRANCH, NEW JERSEY.

AUTOMOBILE SAFETY-SIGNAL.

1,352,039.  Specification of Letters Patent.  Patented Sept. 7, 1920.

Application filed January 3, 1920. Serial No. 349,278.

*To all whom it may concern:*

Be it known that I, FRANK TOKANOS, a citizen of the United States, residing at Long Branch, in the county of Monmouth and State of New Jersey, have invented certain new and useful Improvements in Automobile Safety-Signals, of which the following is a specification.

This invention relates to improvements in automobile safety signals, and the primary object is to provide a device of the character specified which is operable by the driver of the automobile to notify others of a maneuver about to be made by the automobile.

A further, but no less primary, object is to provide a device of the above mentioned character, the peculiar construction of which will attract the attention of drivers of automobiles which are in the rear, to advise them of a maneuver about to be made, than do the appliances used at the present time.

Another object of this invention, is to providt a safety device consisting of a pair of signals, one at each side of an automobile, preferably at the rear thereof, and for convenience of the mud guards, and which are adapted to be illumined separately by electric lamps, to indicate the direction in which the automobile is to be turned.

Other objects and advantages of this invention will appear in the course of the following description, and the particular features of novelty will be pointed out in the appended claim. I desire it understood, however, that various changes in the form and construction of the device may be made within the scope of the appended claim, without departing from the spirit of the invention.

In the drawings, in which similar characters of reference denote similar parts in the several views:

Figure 1 is a rear elevation of an automobile, showing my invention applied thereto, Fig. 2 is a sectional view on the line 2—2 Fig. 1, and Fig. 3 is a top plan view, partly in section, of the socket holding means shown in Fig. 2.

Referring more particularly to the drawings, it will be seen that my improved safety signal comprises two indicators which are fastened to the rear guards of an automobile, one on each guard, and as these indicators are identical in construction, for the sake of brevity, I will describe only one of them.

The signal comprises a hollow, cup-like body portion or casing 1, formed preferably of sheet metal, or other like material which may readily be stamped or pressed into the desired shape.

The general contour of this casing 1 resembles the back of a human hand with the fingers with the exception of the forefinger.

The rear portion 2, of casing 1, is provided with a substantially right angle extension 3, at one end thereof. As clearly shown in Fig. 2, a part of rear portion 2 is formed into a relatively long, regular curve 2' at the end of which is a relatively short right angle extension 3'.

The forward part of casing 1 is open as shown at 5, and encircling this open end and secured at right angles to extensions 3 and 3' and to the entire edge surrounding the opening 5, is a continuous flange 4, upon which rests a glass or other transparent panel 14, which is cut to the design of a human hand.

To secure the glass or other trasparent panel against accidental displacement, I employ an angle frame 15, which conforms to the shape of the panel and as clearly shown in Fig. 2.

The frame 15 is secured by means of screws 16 which are threaded into threaded openings in the extensions 3 and 3' and the remainder of the casing 1 where required.

The extensions 3 and 3' are provided with openings 11 extending therethrough for the purpose of admitting air to the interior of the casing and thereby enable same to be kept from getting extremely hot. This is necessary because of the thinness of the material used in the construction of the device.

The base 2 is provided with a plurality of substantially S-shaped spring clamps 6, which are struck from the material of the casing and extend inwardly thereof. The outer extremities of spring clamps 6 are arcuate shaped, as shown at 8 for the purpose of gripping a lamp socket 9 carrying electric lamp 10 by means of bayonet slot 12. It can be readily seen that the portions 13 of spring clamps 6 serve as an additional binding means for the lamp socket 9 to prevent accidental displacement.

As shown clearly in Fig. 3, openings 7, between the spring clamps 6 are provided for the admission of air to the interior of the casing for the purpose of keeping the casing cool. In other words, these openings act as ventilators for the casing.

The lamp socket, 9, has electrical connection through wires 17, to the storage battery or other source of current of the automobile, a switch (not shown), operable by the driver of the automobile being used to illumine the signal.

The device is secured to the vehicle by means of clamp 18 secured to the mud guard and to the base of casing 1.

It is well known, that to attract the attention of others, a device must of such construction that the eye will immediately take cognizance thereof. My device is especially adapted to immediately attract the attention of drivers of following automobiles and advise them of a maneuver about to be made, by reason of its particular and peculiar design.

In operation, one of these signal casings is placed transversely across the rear guard, at each side of the automobile and is held securely in position by means of the clamp 18. To operate the device, the driver has only to turn the switch which controls the lamp, in the casing, which is disposed in some easily accessible place, to light the lamp, and hence illuminate the casing so as to render the casing and the hand clearly visible. Such words as "Turn" or other appropriate lettering may be used upon the transparent panel, if desired, having them printed in red lettering for safety. The lamp is preferably red, but other colors may be used if desired. If the operator desires to turn to the left, he turns the switch which controls the lamp on the left rear guard, and if he desires to turn to the right he turns the switch which controls the lamp on the right rear guard. Should he desire to advise others of a stop, both lamps may be lighted at the same time.

It is believed that the operation and construction of the device will be readily understood from the above description and operation.

What I claim as new and desire to secure by Letters Patent is:

A device of the character described comprising a hollow casing provided with a plurality of air inlets and conforming to the shape of a human hand, and having its forward part formed open, a plurality of spring clamps struck from the metal forming the rear of said casing and projecting therein and adapted to support an electric lamp socket, a transparent panel secured to the forward part of the casing and covering the above mentioned opening, said panel being in the shape of a human hand, an angle plate secured to the casing and retaining the panel, and a clamp secured to the casing and adapted to secure the device to a vehicle.

In testimony whereof I affix my signature.

FRANK TOKANOS.